United States Patent

Kominami

Patent Number: 6,115,225
Date of Patent: Sep. 5, 2000

[54] POWER SUPPLY SYSTEM

[75] Inventor: Mitsuru Kominami, Fukuoka, Japan

[73] Assignee: Fujitsu Limited, Kawasaki, Japan

[21] Appl. No.: 09/226,309

[22] Filed: Jan. 7, 1999

[30] Foreign Application Priority Data

Jul. 3, 1998 [JP] Japan .................................. 10-188599

[51] Int. Cl.$^7$ ...................................................... H02H 3/00
[52] U.S. Cl. ................................ 361/92; 361/71; 361/115
[58] Field of Search ................................ 361/42, 92, 115, 361/58, 45, 71, 72

[56] References Cited

U.S. PATENT DOCUMENTS 5,825,708 10/1998 Bennett .................................... 365/226

*Primary Examiner*—Stephen W. Jackson
*Attorney, Agent, or Firm*—Helfgott & Karas, PC.

[57] ABSTRACT

There is provided a power supply system which is capable of eliminating inconvenience affecting a storage device in the event of a power failure. Monitoring control means monitors supply voltage provided by a DC power supply connected to a power-supplied device and outputs a warning signal to transition means when the absolute value of the supply voltage becomes equal to or smaller than a predetermined voltage value. The transition means causes transition of the operative state of a storage device included in the power-supplied device to an operation terminated state. More specifically, if the storage device is a hard disk drive and the hard disk drive is performing write operation, the hard disk drive is caused to undergo operative state transition to a stable state in which the write operation has been terminated. Further, if the storage device is comprised of a working storage unit and a backup one, the operative state transition of the storage device is carried out such that the two storage units have identical data stored therein, followed by inhibiting the operation of the storage device.

8 Claims, 7 Drawing Sheets

| FREQUENCY | MEASURED VALUE | PRESET VALUE |
|---|---|---|
| 50 Hz | a1 | b1 |
| 60 Hz | a2 | b2 |
| 70 Hz | a3 | b3 |
|  |  |  |
|  |  |  |
|  |  |  |
| 100kHz | an | bn |

FIG. 4

POWER SUPPLY SYSTEM

BACKGROUND OF THE INVENTION

1. Field of the Invention

The present invention relates to a power supply system, and more particularly to a power supply system which is capable of supplying DC power by using a battery in the event of a failure of an AC power supply.

2. Description of the Related Art

A power-supplied device which will remarkably benefit from the effects of the present invention is a telephone switchboard, for instance.

In general, the telephone switchboard operates on −48V DC power. This DC current is supplied from a battery storing DC power converted from AC power supplied by an AC commercial power supply.

FIG. 7 shows a conventional power supply system for use with a telephone switchboard. A commercial AC power supply is connected to a rectifier 101. AC power provided by the AC power supply is converted to DC power to charge batteries 102a, 102b. Also connected to the rectifier 101 is a small generator provided for use in the event of a failure of the commercial power supply.

The batteries 102a, 102b have positive electrodes thereof grounded. The batteries 102a, 102b supply DC power at −48V to switchboards 105, 106 via distribution boards 103, 104. The DC power from the distribution board 103 is also supplied to another device 109 which needs the DC power. The distribution board 104 serves exclusively for the switchboards 105, 106 which are provided redundantly. The switchboard 105 is a working switchboard (#0), while the switchboard 106 is a backup one (#1). The switchboards 105, 106 have respective control units (CC) 107, 108 connected thereto.

This type of power supply system has a ground window (GW) 111 formed by a metal piece grounded via a ground line (MGB). A battery ground line (CG) 112, a switchboard ground line (SG) 113, and a cabinet ground line (FG) 114 are connected to this ground window (GW) 111.

Information of a failure of the commercial power supply is sent to an alarm collecting unit 119, which in turn sends the information to the switchboards 105, 106.

The −48V DC power is supplied to still another device 110 via the distribution board 104 and a line 116 connected between the distribution board 104 and the device 110. In the device 110, the DC voltage is converted to another DC voltage by an internal DC—DC converter. The device 110 operates on the voltage obtained by the conversion. A line 117 is a ground line for the new voltage produced in the device 110, while a line 118 is a cabinet ground line.

When this kind of power supply system is used in a developing country, the failure of a commercial power supply frequently occurs, causing wear and degradation of the small generator at a fast rate. Therefore, it is likely that the small generator can no longer operate properly in the event of a failure of the commercial power supply, and the voltage provided by the batteries 102a, 102b is gradually decreased, finally disabling the switchboards 105, 106. In such a case, the switchboards 105, 106 are notified by the alarm collecting unit 119 of occurrence of the failure of the commercial power supply. However, the switchboards 105, 106 are not warned of the danger of being disabled due to a decrease in the voltage provided by the batteries 102a, 102b.

Therefore, hard disk drives provided in the control units 107, 108 can be forced to stop in the middle of writing operation. In such a case, it often happens that a writing arm of the hard disk drive touches a disk surface to blemish the same. Further, there occurs a problem that the working control unit 107 and the backup control unit 108 are forced to terminate operation with non-volatile memories thereof having different data stored therein.

Furthermore, noise generated in the device 109 reaches the ground window (GW) 111 via the battery ground line (CG) 112 and then enters the switchboards 105, 106 via the switchboard line (SG) 113 and the cabinet ground line (FG) 114. Further, noise having a switching frequency is generated in the device 110 during DC—DC conversion and enters the switchboards 105, 106 via the lines 117, 118.

In developing countries, electric works concerning power supplies, which are involved in inside extension of switchboards, takes place frequently. In such electric works, it is likely that grounding work is not properly carried out or proper grounding is not established due to inherent improper connections of reinforcing steels of the building within which the electric works are carried out. Such improper grounding causes mixing of the above-mentioned noise with telephone signals to a significant degree. Further, the frequency of a clock used in the internal circuit of a telephone switchboard is apt to be increased, and the operating voltage in the circuit is apt to be decreased, which leads to a decrease in resistance of the switchboard to entry of the noise.

SUMMARY OF THE INVENTION

It is an object of the invention to provide a power supply system which is capable of eliminating inconvenience affecting a storage device in the event of a power failure.

It is another object of the invention to provide a power supply system which is capable of preventing entry of noise into a power-supplied system due to improper grounding.

To attain the object, there is provided a power supply system which is capable of supplying DC power by using a battery in the event of a failure of an AC power supply. This power supply system is characterized by comprising monitoring control means for monitoring supply voltage provided by the DC power supply and outputting a warning signal when an absolute value of the supply voltage becomes equal to or smaller than a predetermined voltage value, and transition means for causing transition of an operative state of a storage device included in a power-supplied device to an operation terminated state.

To attain the other object, there is provided a power supply system for supplying DC power to a power-supplied device having a plurality of grounding portions. The power supply system comprises noise voltage value detection means for detecting a value of noise voltage generated between each pair of the grounding portions at each frequency level, based on ground potentials at the grounding portions, detection means for determining a noise voltage value larger than a corresponding preset value from the noise voltage values detected by the noise voltage value detection means, and then detecting a pair of grounding portions between which the determined value of noise voltage is detected, and a frequency associated with the determined noise voltage value, and filter insertion means for interposing a filter blocking the noise having the frequency detected by the detection means, between the pair of grounding portions detected by the detection means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a diagram showing a table storing noise voltage values measured between ground detection lines at respective frequency levels and corresponding preset values;

DESCRIPTION OF THE PREFERRED EMBODIMENTS

Preferred embodiments of the present invention will be described below with reference to accompanying drawings.

Figure 1:
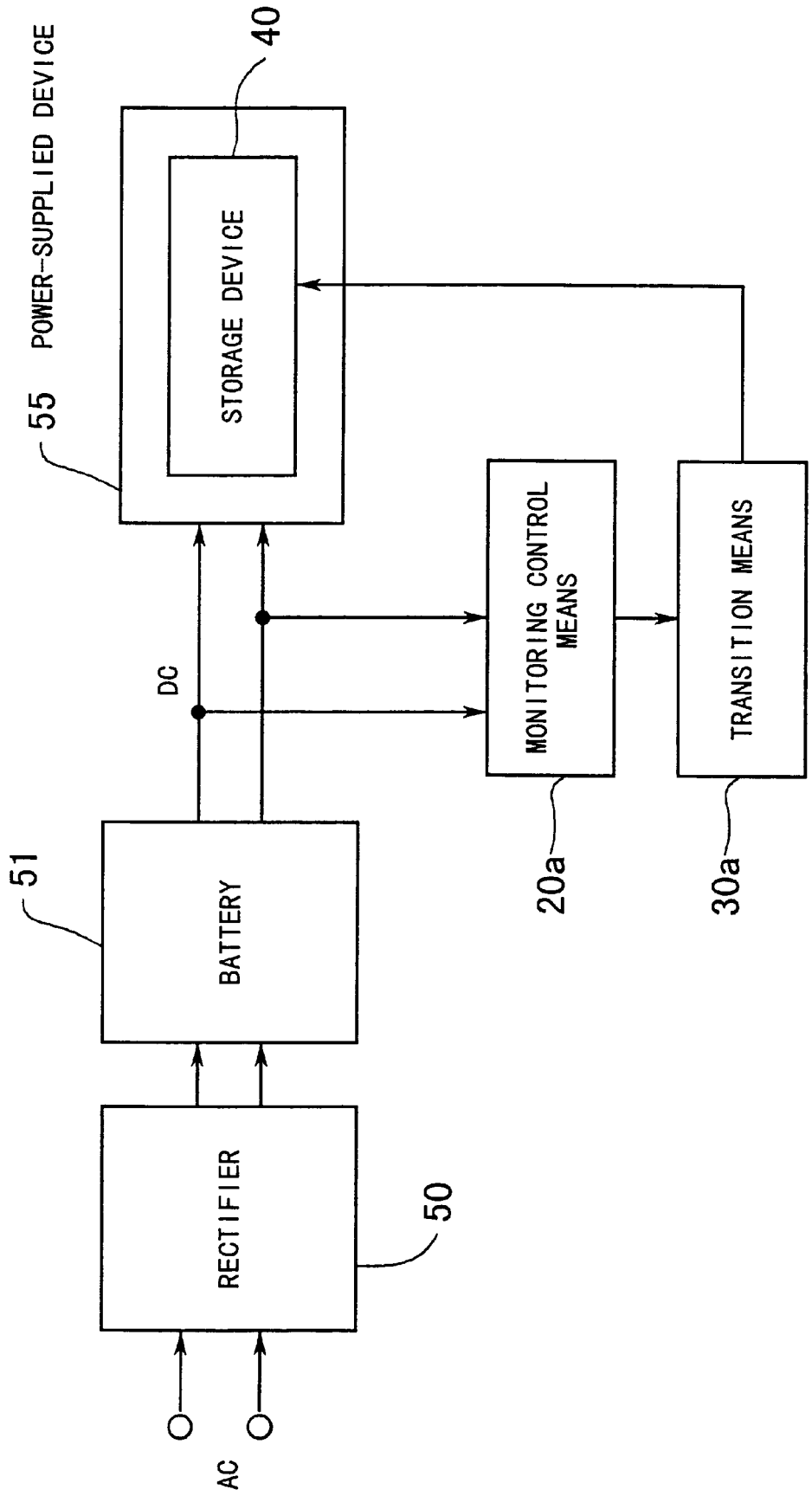
FIG. 1 is a conceptual representation of construction of a power supply system according to a first embodiment of the present invention.

Referring first to FIG. 1, the principles and construction of a power supply system according to a first embodiment of the invention will be described. The power supply system of the first embodiment includes monitoring control means 20a for monitoring a supply voltage provided by a DC power supply and outputting a warning signal when the absolute value of the supply voltage becomes equal to or smaller than a predetermined voltage value, and transition means 30a for causing transition of the operative state of a storage device 40 incorporated in a power-supplied device 55 to an operation terminated state.

As shown in FIG. 1, an AC power supply is connected to a rectifier 50. The rectifier 50 converts AC power to DC power and the DC power thus obtained is stored in a battery 51. DC current flows from the battery 51 to the power-supplied device 55. The power-supplied device 55 may be a telephone switchboard which incorporates the storage device 40.

The monitoring control means 20a monitors the supply voltage provided by the DC power supply to the power-supplied device 55, and delivers a warning signal to the transition means 30a when the absolute value of the supply voltage becomes equal to or smaller than the predetermined voltage value. In response to the warning signal received from the monitoring control means 20a, the transition means 30a causes transition of the operative state of the storage device 40 in the power-supplied device 55 to the operation terminated state.

More specifically, if the storage device 40 is a hard disk drive, and write operation is being performed by the hard disk drive, the transition means 30a causes transition of the operative state of the hard disk drive to a stable state in which the write operation is terminated. Further, if the storage device 40 is comprised of a working storage unit and a backup storage unit, the operative state transition is effected such that the working and backup storage units store identical data. Thereafter, the storage device 40 is inhibited from operating.

The predetermined voltage value used as a reference when the monitoring control means 20a generates a warning signal is set to a value large enough to allow the operative state transition of the storage device 40 to be completed.

This prevents damage to the hard disk drive and deletion of register information, both of which could conventionally occur to the storage device 40 in the event of a power failure.

Next, the first embodiment will be described in more detail. It should be noted that in the first embodiment described below, rectifiers 50a, 50b in FIG. 2 correspond to the rectifier 50 appearing in FIG. 1, batteries 51a, 51b to the battery 51, a monitoring control block 20 to the monitoring control means 20a, and a transition control block 30 to the transition means 30a.

Figure 2:
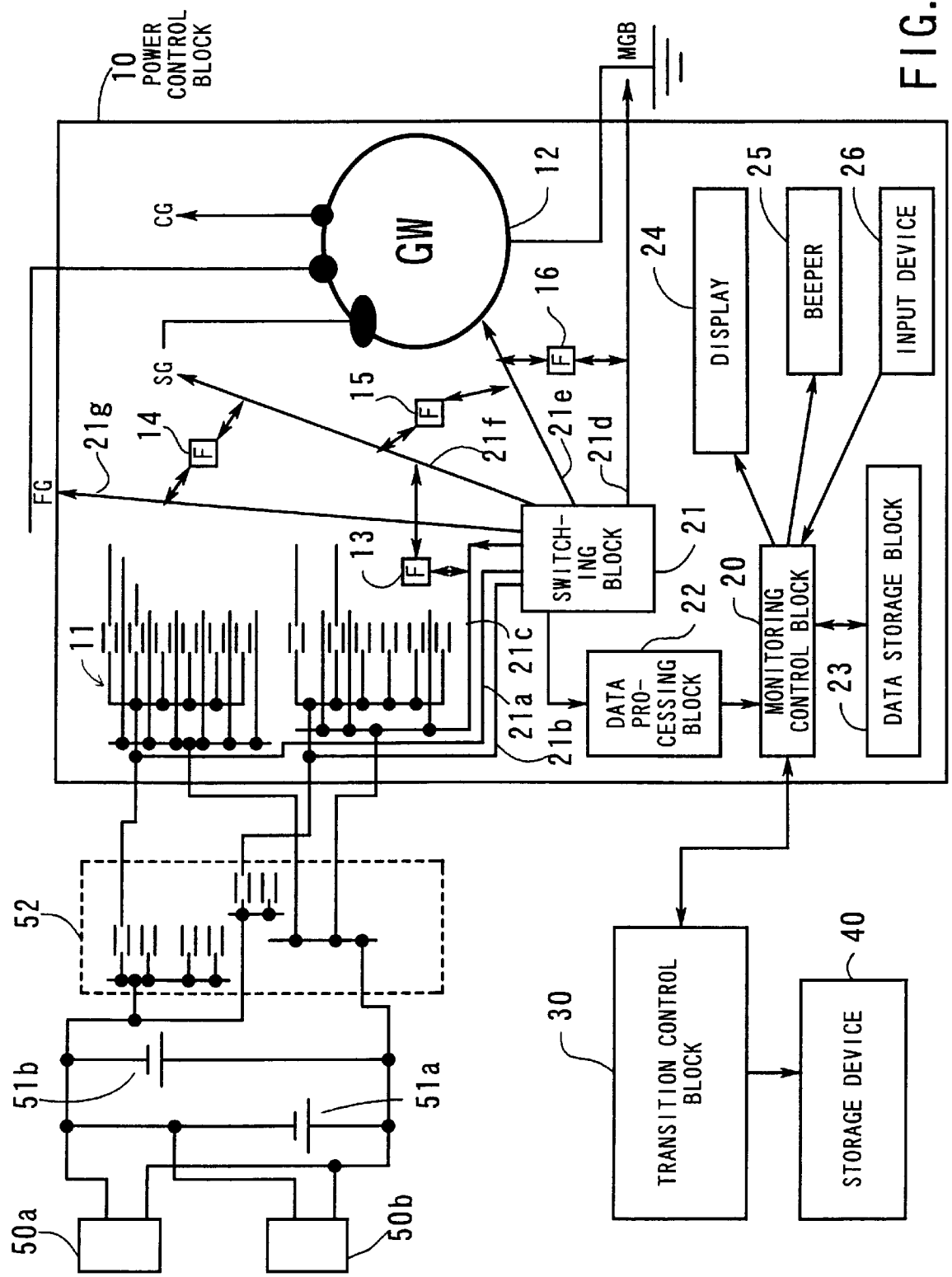
FIG. 2 is a block diagram showing the whole arrangement of the power supply system for use with a telephone switchboard, according to the first embodiment of the invention.

FIG. 2 shows the whole arrangement of a power supply system for use with a telephone switchboard, according to the first embodiment. A commercial AC power supply is connected to the rectifiers 50a, 50b. The AC power supplied from the AC power supply is converted by the rectifiers 50a, 50b to DC power for charging the batteries 51a, 51b. Positive electrodes of the batteries 51a, 51b are grounded. DC current at −48 V flows from the batteries 51a, 51b to a power control block 10 via a distribution board 52. Arranged in the power control block 10 is an intra-switchboard distribution board 11 via which the DC current at −48 V is supplied to the telephone switchboard, not shown. The distribution board 52 and the intra-switchboard distribution board 11 each have a redundant construction of a working unit and a backup unit. Power is supplied from the working unit of the distribution board 11 to a working unit of the switchboard and from the backup unit of the distribution board 11 to a backup unit of the switchboard.

Further, a ground window (GW) 12 formed by a metal piece is provided in the power control block 10. The ground window (GW) 12 is grounded via a ground line MGB. Further, connected to the ground window (GW) 12 are three ground lines, i.e., a battery ground line CG extending from the positive sides of the batteries 51a, 51b, a switchboard ground line SG extending from a ground side of a digital circuit incorporated in the switchboard, and a cabinet ground line FG extending from a cabinet containing the switchboard.

The power control block 10 incorporates a switching block 21 to which are connected a working −48V potential detection line 21a and a backup −48V potential detection line 21b extending from respective lines connecting between the distribution board 52 and the intra-switchboard distribution board 11, as well as a CG ground potential detection line 21c. Further, connected to the switching block 21 are a GW potential detection line 21e extending from the ground window (GW) 12 as well as an MGB ground potential detection line 21d, an SG ground potential detection line 21f, and an FG ground potential detection line 21g extending from the respective ground lines connected to the ground window (GW). The switching block 21 sequentially selects one of the potentials at the respective detection lines, and supplies a selected potential to a data processing block 22.

Filters (F) 13 to 16 can be interposed respectively between the detection lines 21c, 21g, 21f, 21e and 21d, which will be described in detail hereinafter.

The data processing block 22 detects a potential difference between a potential at the working −48V potential detection line 21a or the backup −48V potential detection line 21b and a potential at the CG ground potential detection line 21c, converts the detected potential difference (hereinafter referred to as "−48V DC potential difference")

into a digital value, and then sends the digital value to the monitoring control block 20 as an RS232C signal. Further, the data processing block 22 detects a value of noise voltage generated between each pair of the detection lines 21c, 21g, 21f, 21e and 21d, at each frequency level, converts each detected value to a digital value, and then sends the digital value to the monitoring control block 20 as an RS232C signal. The data processing block 22 will be described in more detail hereinafter.

The monitoring control block 20 receives a predetermined voltage value (threshold level voltage value) and preset values set for the respective frequency levels in advance from the transition control block 30, and stores the values in a data storage block 23. Further, the monitoring control block 20 receives the −48V DC potential difference (RS232C signal) and the noise voltage values (RS232C signals) detected between the detection lines at the respective frequency levels from the data processing block 22, at any time, and stores them in the data storage block 23.

First, the monitoring control block 20 reads out the −48V DC potential difference and the predetermined voltage value stored in the data storage block 23, and then compares the absolute value of the −48V DC potential difference with the predetermined voltage value. If the former is smaller than the latter, the monitoring control block 20 generates a warning signal, which is delivered to the transition control block 30.

The transition control block 30 is comprised of a processor and software executed by the processor, and incorporated in a control unit, not shown, of the switchboard. When receiving the warning signal from the monitoring control block 20, the transition control block 30 causes transition of the operative state of the storage device 40 to an operation terminated state. The storage device 40, which is also included in the control unit of the switchboard, is comprised of hard disk drives having a redundant construction, and non-volatile memories. The operation terminated state mentioned above is defined as a state in which a working storage unit and a backup storage unit of the storage device 40 have identical data stored therein and none of the hard disk drives are performing a write operation. When receiving the warning signal from the monitoring control block 20, the transition control block 30 copies data stored in the working hard disk drive and non-volatile memory to the backup hard disk drive and non-volatile memory so as to store identical data in the working and backup hard disk drives and non-volatile memories, and then causes transition of the operative state of the hard disk drive to a state in which the write operation has been terminated (i.e., a stable state with a writing arm kept off the disk surface), and places the hard disk drive in a shutdown state in which writing is inhibited. This prevents deletion of register data and damage to the hard disk drive.

The predetermined voltage value is set to a value which can sustain operation of the storage device 40 during the transition of the operative state of the storage device 40 to the operation terminated state.

Further, the monitoring control block 20 causes a display 24 to display data of the −48V DC potential difference stored in the data storage block 23, or causes a beeper 25 to operate based on the potential difference data to thereby give a warning to the operator. An input device 26 is used by the operator to set the predetermined voltage value to the transition control block 30 via the monitoring control block 20, set a predetermined potential difference value used for causing the beeper 25 to operate, or instruct the monitoring control block 20 as to the kind of contents to be displayed on the display 24 so that the operator can check a fault (fault time, fault location, etc.).

Further, the monitoring control block 20 reads out a noise voltage value detected between each pair of the ground detection lines at each frequency level and the corresponding preset value from the data storage block 23 to compare the former with the latter.

FIG. 4 shows a noise voltage value detected between each pair of ground detection lines at each frequency level and a corresponding preset value, which are stored in the data storage block 23. The data storage block 23 has storage areas each provided for storing noise voltage values detected between a corresponding pair of the ground detection lines at respective frequency levels and the corresponding preset values. The predetermined frequency levels are set e.g., between 50 Hz and 100 kHz. In FIG. 4, for instance, a noise voltage value (measured value) a1 is stored together with a preset value b1 at a frequency level of 50 Hz, and a noise voltage value (measured value) an is stored together with a preset value bn at a frequency level of 100 kHz.

Referring again to FIG. 2, the monitoring control block 20 compares a noise voltage value detects(measures) between each pair of the ground detection lines at each frequency level with a corresponding preset value, and determines a pair of ground detection lines between which a noise voltage value (measured value) is larger than the corresponding preset value, and a frequency associated with the noise voltage value. Then, which of e.g., seven preset frequency ranges contains the predetermined frequency is determined. In this embodiment, the seven frequency ranges are set to ranges 50 to 100 Hz, 100 to 500 Hz, 500 to 1000 Hz, 1 to 5 kHz, 5 to 10 kHz, 10 to 50 kHz, and 50 to 100 kHz. After a relevant frequency range is determined, a filter for attenuating the noise in the frequency range is interposed between the determined pair of ground detection lines. For instance, if a value (ai) of a noise voltage having a frequency of 50 Hz and generated between the GW potential detection line 21e and the MGB ground potential detection line 21d exceeds a corresponding preset value (bi), a filter 16 is interposed between the GW potential detection line 21e and the MGB ground potential detection line 21d to attenuate the noise in the frequency range of 50 to 100 Hz.

Thus, the noise generated between ground detection lines can be eliminated. It is expected that the noise to be detected by the monitoring control block 20 includes one having a commercial power frequency, one having a switching frequency of operation of a DC—DC converter, one having a frequency of rotation of a radiating fan, and so forth.

When it is detected that a noise voltage value (measured value) is larger than a corresponding preset value, the monitoring control block 20 causes the display 24 to display the detected pair of ground detection lines and frequency, and then causes the beeper 25 to operate. This beeper 25 may be replaced by an LED lighting unit.

Figure 3:
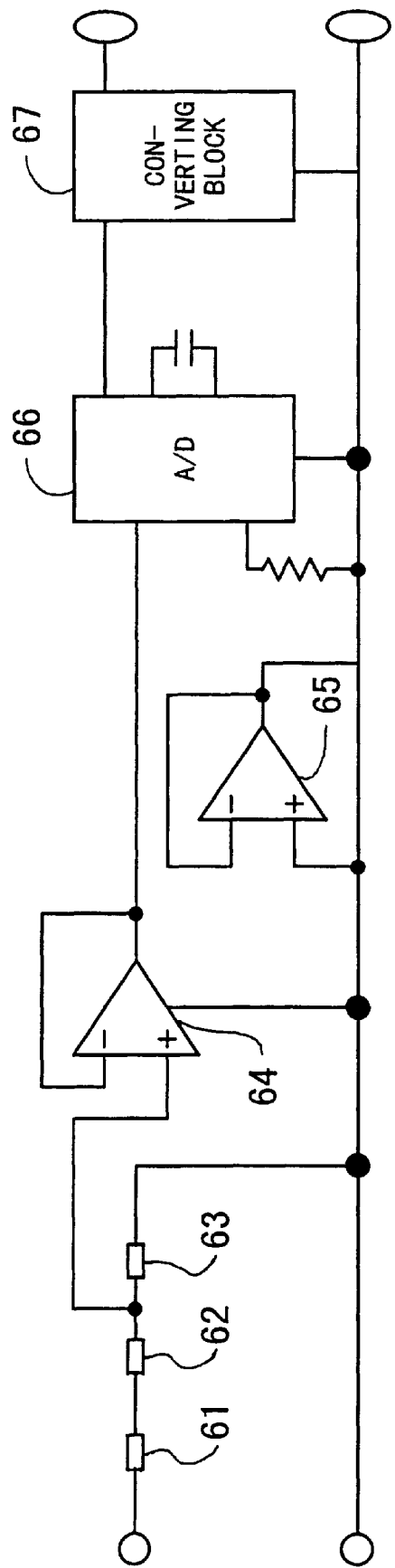
FIG. 3 is a circuit diagram showing a circuit provided in a data processing block, for converting a potential difference between a potential at a −48V DC line and the ground level into a digital value.

FIG. 3 shows a circuit provided in the data processing block 22, for converting the −48V DC potential difference into a digital value and further into an RS232C signal. In the circuit, resistors 61 to 63 are used to divide the analog −48V DC potential difference to obtain a voltage having a proportionally lowered absolute value and then deliver the same to operational amplifiers 64, 65. The operational amplifiers 64, 65 are of voltage follower type in which input impedance is raised, and are each operated as a differential amplifier. Therefore, noise components which simultaneously enter the operational amplifiers 64, 65 are eliminated to apply an accurate measurement voltage representative of the detected potential difference to an A/D converter 66.

The A/D converter 66 converts the measurement voltage into a digital value and then delivers the digital value to a converting block 67. The converting block 67 converts the digital value into an RS232C signal suitable for transmission to a remote place. The RS232C signal is sent to the monitoring control block 20. It should be noted that the monitoring control block 20 has a function of converting the RS232C signal to a digital signal, which, however, is omitted in the above description.

Figure 5:
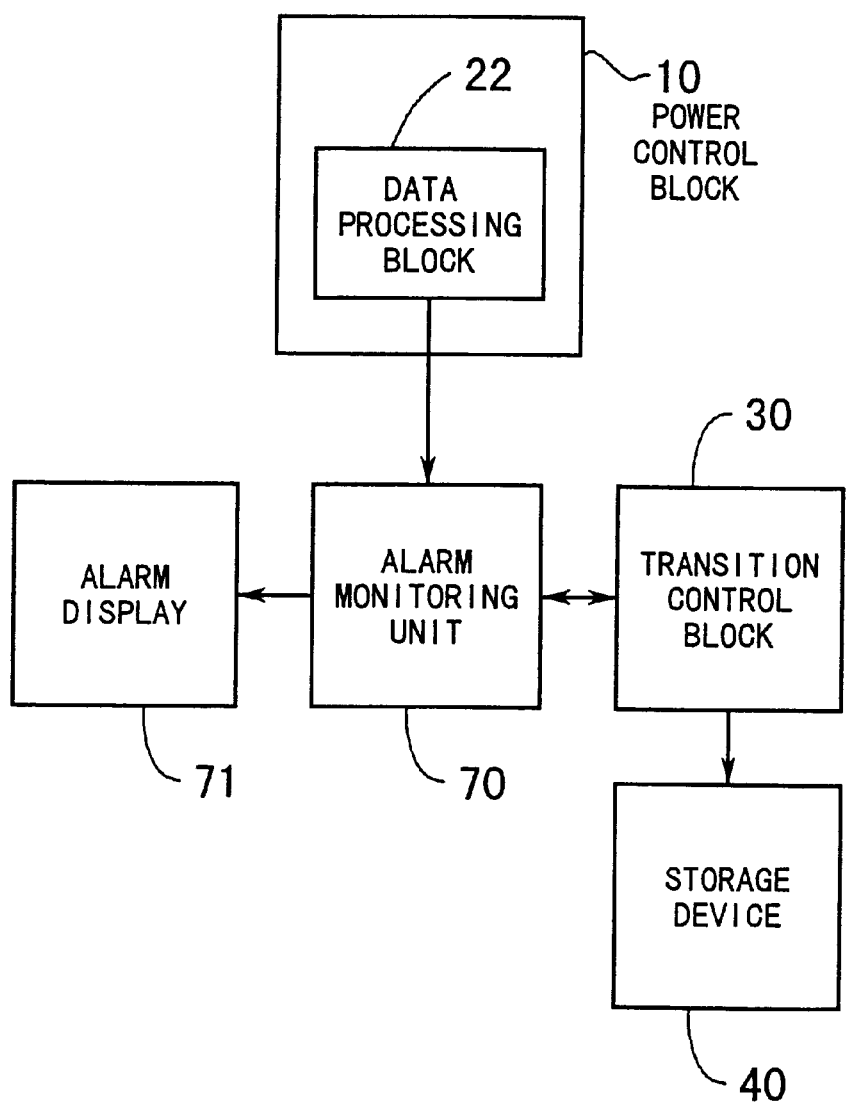
FIG. 5 is a conceptual representation of construction of a power supply system according to a second embodiment.

The power supply system of the present invention may have a construction shown in FIG. 5 in place of the one shown in FIG. 2.

FIG. 5 shows the power supply system according to a second embodiment of the present invention, which is distinguished from that of the first embodiment in a modified part thereof.

Figure 7:
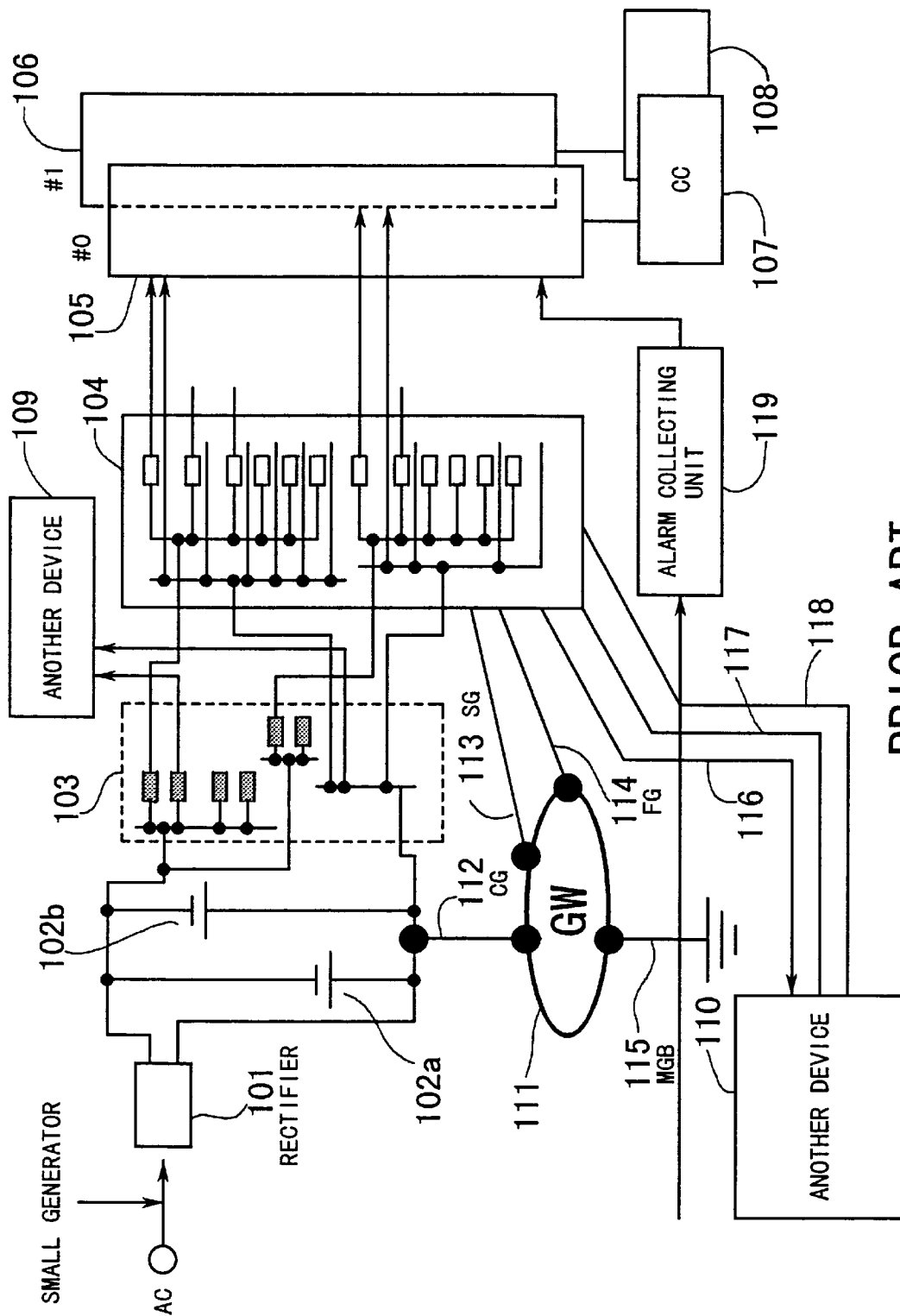
FIG. 7 is a block diagram showing a conventional power supply system connected to telephone switchboards.

More specifically, the second embodiment is distinguished from the first embodiment in which the monitoring control block 20 is provided within the power control block 10, in that no monitoring control block is provided in a power control block 10, but an alarm monitoring unit 70 implements the function of the monitoring control block 20 as one of its capabilities. The alarm monitoring unit 70 corresponds to a conventional alarm collecting unit 119 appearing in FIG. 7. The alarm monitoring unit 70 collects various alarms concerning the environment of the system and passes each alarm to a relevant unit. A transition control block 30 is connected to the alarm monitoring unit 70, and a storage device 40 is connected to the transition control block 30. An alarm display 71 connected to the alarm monitoring unit 70 serves the same end as that of the beeper 25 in the first embodiment.

The system of the second embodiment is identical in operation to that of the first embodiment.

Next, a third embodiment of the present invention will be described.

Figure 6:
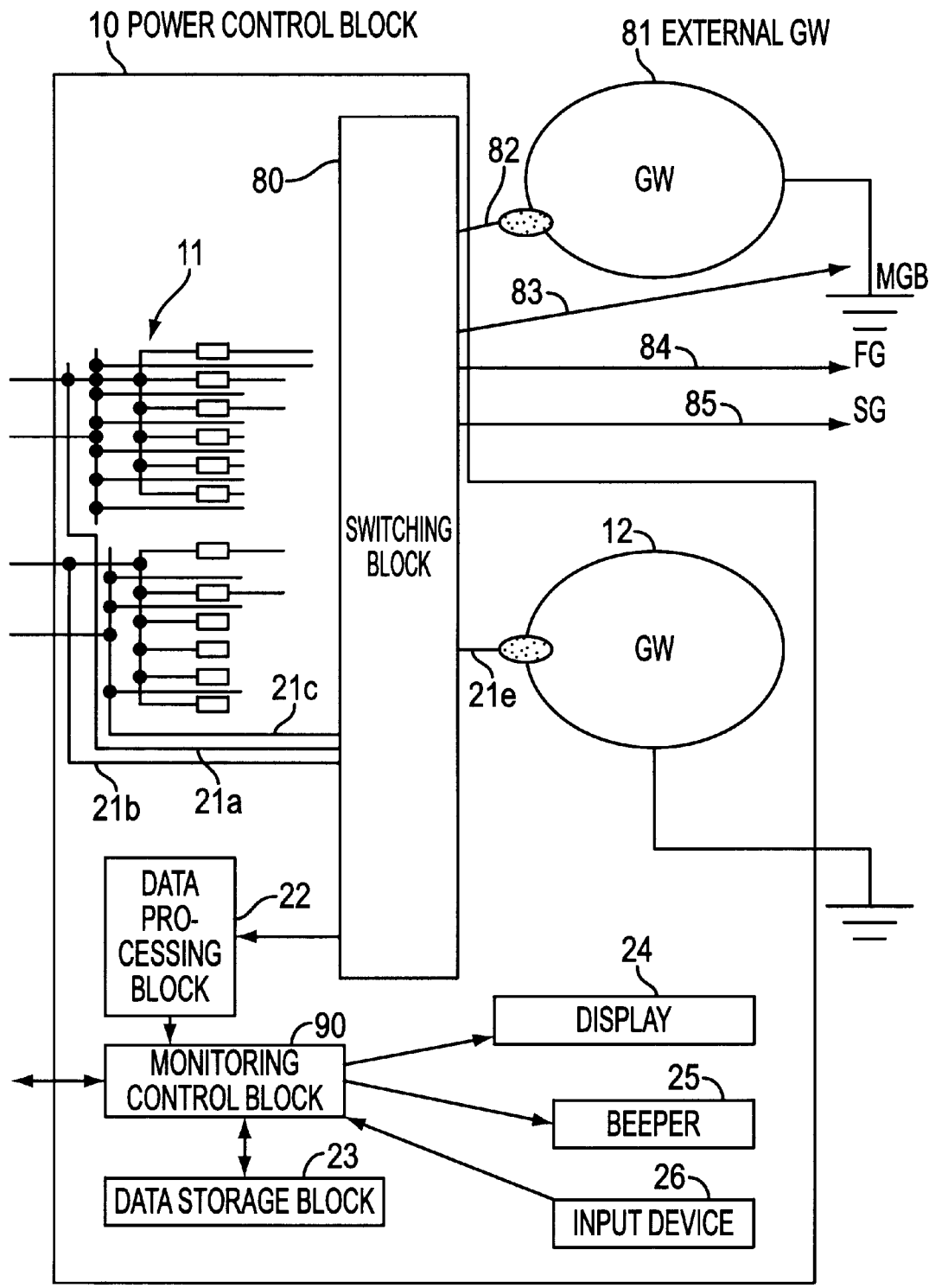
FIG. 6 is a block diagram showing the whole arrangement of the power supply system for use with a telephone switchboard, according to a third embodiment.

FIG. 6 shows a construction of a power supply system according to the third embodiment, which is basically identical with that of the power supply system according to the first embodiment. Therefore, component parts and elements similar to those of the first embodiment are designated by identical reference numerals, and detailed description thereof is omitted. In FIG. 6, some component parts and elements which require no further explanation are not shown.

In the third embodiment, an external ground window (GW) 81 formed by a metal piece is provided outside a power control block 10 in addition to a ground window (GW) 12 provided within the power control block 10. A battery ground line CG, a switchboard ground line SG, and a cabinet ground line FG are connected to the external ground window (GW) 81.

A switching block 80 has connections identical to those of the switching block 21 of the first embodiment. Further, connected to the switching block 80 are a GW potential detection line 82 extending from the external ground window (GW) 81 as well as an MGB ground potential detection line 83, an SG ground potential detection line 85, and an FG ground potential detection line 84 extending from the respective ground lines connected to the external ground window (GW) 81.

Normally, the switching block 80 performs quite the same operation as performed by the switching block 21 of the first embodiment.

A monitoring control block 90 also performs operations identical to those of the monitoring control block 20 of the first embodiment. In addition, the monitoring control block 90 detects a potential difference between each pair of potentials at respective grounding portions connected to the external ground, i.e., between a potential at the MGB ground potential detection line 21*d* and a potential at each of the GW potential detection line 21*e*, the SG ground potential detection line 21*f*, and the FG ground potential detection line 21*g*. Then, the monitoring control block 90 determines whether or not there exists a potential difference larger than a predetermined reference value among the detected (measured) potential differences. If there is a potential difference larger than the predetermined reference value, it is judged that there is an anomaly in grounding, and the ground window (GW) 12 is switched to the external ground window (GW) 81. More specifically, the switching block 80 sequentially selects one of potentials at the respective potential detection lines 82, 83, 85 and 84, and allows the selected potential to be supplied to a data processing block 22. On the other hand, selective switching of potentials at the GW potential detection line 21*e*, the MGB ground potential detection line 21*d*, the SG ground potential detection line 21*f*, and the FG ground potential detection line 21*g* connected to the ground window (GW) 12 is stopped.

It should be noted that when the monitoring control block 90 detects a noise voltage value larger than a corresponding preset value, the ground window (GW) 12 may be switched to the external ground window (GW) 81.

Thus, the MGB ground line connected to the external GW 81 can serve as an alternative reliable grounding route to the MGB ground line connected to the ground window (GW) 12, ensuring a stable ground potential of the system.

An external device (not shown) may be notified of the above switching.

As described above, according to the present invention, the monitoring control means monitors supply voltage provided by the DC power supply, and when the absolute value of the supply voltage becomes equal to or smaller than the predetermined voltage value, the transition means causes transition of the operative state of the storage device included in the power-supplied device to an operation terminated state.

That is, when the storage device is a hard disk drive and the hard disk drive is performing a write operation, the hard disk drive is caused to undergo operative state transition to a stable state in which the write operation has been terminated. Further, when the storage device is provided with a working storage unit and a backup storage unit, the operative state transition is carried out such that the two storage units have identical data stored therein, followed by inhibiting the operation of the storage device.

This prevents damage to the hard disk drive and deletion of register information, both of which could conventionally occur to the storage device in the event of a power failure.

Further, the noise voltage value detection means detects a noise voltage generated between each pair of potentials at grounding portions at each frequency level, based on ground potentials at the respective grounding portions. Then, the detection means determines a noise voltage value larger than a corresponding preset value from the noise voltage values detected by the noise voltage value detection means and detects the relevant pair of grounding portions and a frequency associated with the determined noise voltage value. Thereafter, the filter insertion means interposes a filter blocking noise having the detected frequency between the detected pair of grounding portions.

This makes it possible to prevent noise generated due to improper grounding from entering the power-supplied device.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A power supply system which is capable of supping DC power by using a battery in the event of a failure of a AC power supply, comprising:
    monitoring control means for monitoring supply voltage provided by said DC power supply and outputting a warning signal when an absolute of said power supply voltage becomes equal to or smaller than a predetermined voltage value;
    transition means for causing transition of an operative state of a storage device included in a power-supplied device to an operation terminated state wherein said storage device is in a stable state in which a write operation is terminated.

2. A power supply system according to claim 1, wherein said predetermined voltage value is set to a value which is a predetermined value larger than a value of said absolute value of said supply voltage value at which said storage device is no longer capable of operating.

3. A power supply system according to claim 1, wherein said storage device comprises a hard disk drive, and wherein said operation terminated state is a state in which at least said hard disk drive is not performing write operation.

4. A power supply system according to claim 1, wherein said storage device includes a working storage unit and a backup storage unit, and wherein said operation terminated state is a state in which said working storage unit and said backup storage unit have identical data stored therein.

5. A power supply system according to claim 1, further comprising warning generation means for generating a warning when receiving a warning signal from said monitoring control system.

6. A power supply system for supplying DC power to a power-supplied device having a plurality of grounding portions, comprising:
    noise voltage value detection means for detecting a value of noise voltage generated between each pair of said grounding portions at each frequency level, based on ground potentials at said grounding portions;
    detection means for determining a noise voltage value larger than a corresponding preset value from the noise voltage values detected by said noise voltage value detection means, and then detecting a pair of grounding portions between which the determined noise voltage value is detected and a frequency associated with the determined noise voltage value; and
    filter insertion means for interposing a filter blocking noise having said frequency detected by said detection means, between said pair of grounding portions detected by said detection means.

7. A power supply system according to claim 6, wherein said plurality of grounding portions include at least two of a cabinet of said power-supplied device, a grounding portion of an electric circuit included in said power-supplied device, an external grounding portion of said power-supplied device, and a battery grounding portion.

8. A power supply system for supplying DC power to a power-supplied device having a plurality of grounding portions as well as a working external grounding portion and a backup external grounding portion, comprising:
    potential difference detection means for detecting a potential differences between said working external grounding portion and each of said plurality of grounding portions, based on ground potentials at said grounding portions and said working external grounding portion; and
    external grounding portion switching means for determining whether there exists a potential difference larger than a predetermined reference value among said potential differences detected by said potential difference detection means, and stopping use of said working external grounding portion and at the same time starting use of said backup external grounding portion if there exists a potential difference larger than said predetermined reference value.

* * * * *